Aug. 14, 1951     A. TOWNHILL     2,563,887
STRUT TYPE PISTON
Filed March 2, 1948
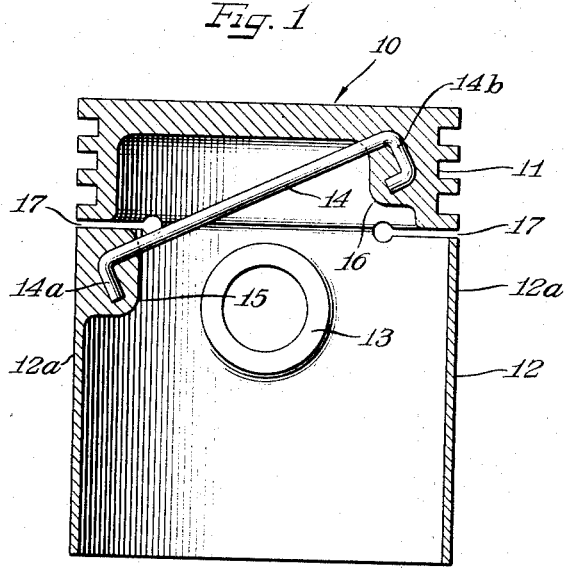
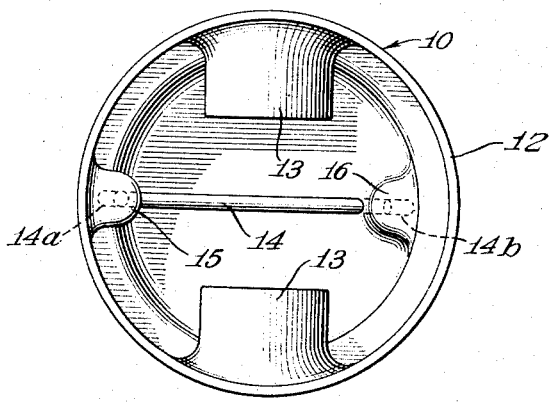
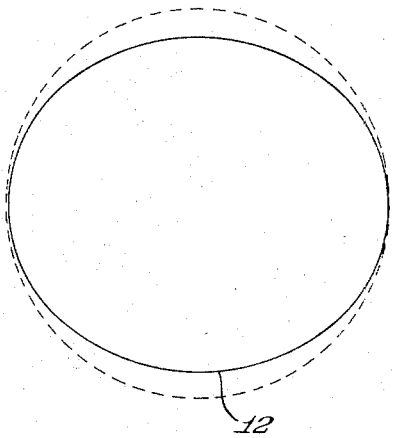
Inventor
Arthur Townhill Patented Aug. 14, 1951

2,563,887

UNITED STATES PATENT OFFICE 2,563,887

STRUT TYPE PISTON

Arthur Townhill, Cleveland, Ohio, assignor to Thompson Products, Inc., Cleveland, Ohio, a corporation of Ohio Application March 2, 1948, Serial No. 12,637

3 Claims. (Cl. 309—13)

This invention relates to a piston construction for internal combustion engines, and particularly to a piston having controlled thermal expansion properties.

It has heretofore been common to fabricate pistons from light metals or alloys having thermal expansion coefficients substantially greater than the material of the engine block in which such pistons operate. In order to compensate for the undesirable effects which would otherwise result from the unequal expansion of the piston with respect to the engine block during their normal operation, a large number of expedients have been proposed heretofore for controlling the thermal expansion of a light metal piston so as to maintain a substantially constant clearance between the thrust faces of the piston and the cylinder bore over the wide range of temperatures encountered in the normal operation of an internal combustion engine.

In my prior Patent No. 2,373,518, issued April 10, 1945, there is disclosed and claimed a controlled expansion piston wherein an expansion control band or link is integrally incorporated in the piston, having one side of the band passing through the head portion of the piston and the other side of the band extending through the top portion of the piston skirt. While this construction is very effective in attaining the desired expansion control characteristics, it does involve some manufacturing difficulties in the casting of the expansion control ring into the piston material.

In accordance with this invention, a controlled expansion piston construction is provided wherein the expansion of one of the thrust faces of the piston skirt is controlled through a rigid connection to the diametrically opposite portion of the head of the piston. Those skilled in this art will recognize that in the normal operation of the piston, the head portion will tend to expand in the direction transverse to the action of the wrist pin bosses to a substantially less extent than the corresponding portions of the skirt, which skirt portions, of course, constitute the thrust faces of the piston. In accordance with this invention, such portions of the head and skirt are interconnected by an expansion control strap or rod which is preferably formed of material having a substantially lower thermal coefficient of expansion than the material of the piston. In this manner, the expansion of the thrust face portions of the piston may be accurately controlled and hence the required diameter across the bearing faces of the piston may be maintained with an unusual degree of accuracy over a wide temperature range.

Accordingly, it is an object of this invention to provide an improved piston construction, particularly a controlled expansion piston construction having improved expansion characteristics.

Another object of this invention is to provide a controlled expansion piston wherein the effective diameter across the thrust faces of the piston is controlled by a rigid connection to a diametrically opposite portion of the piston head.

A particular object of this invention is to provide an improved expansion control arrangement for a trunk type piston wherein a control rod of material of substantially lower thermal expansion coefficient in the material of the piston has its opposite ends respectively anchored in the top of one thrust face portion of the piston skirt and the diametrically opposed portion of the piston head.

The specific nature of the invention, as well as the objects and advantages thereof will become apparent to those skilled in the art from the following detailed description and annexed sheet of drawings which, by way of preferred example only, illustrate one embodiment of the invention.

On the drawings:

Figure 1 is a vertical sectional view, taken transversely through the axis of the wrist pin bosses, of a piston construction embodying this invention;

Figure 2 is a bottom elevational view of the piston of Figure 1; and

Figure 3 is a schematic outline view illustrating in exaggerated form the normal shape of the skirt of the piston of Figure 1, and the shape assumed when heated to operating temperatures.

As shown on the drawings:

While not limited thereto, this invention is particularly applicable to one piece trunk type piston which may be conveniently manufactured by casting of light metals, such as aluminum, magnesium or alloys thereof in existing automatic molding machinery. Such piston may comprise a head portion 10 having a depending ring flange 11 integrally formed thereon and hollow skirt 12 integrally secured to the bottom of the ring flange 11.

The skirt 12 defines opposed wrist pin bosses 13. The exterior surface of the skirt 12 is machined to provide a slightly oval configuration, as indicated in exaggerated form by the solid lines in Figure 3 with the major axis of the oval or elliptical cross section being disposed perpendicularly to the axis of the wrist pin bosses 13.

In order to produce a concentration of heat flow from the head portion 10 to the skirt 12 through the wrist pin boss portions thereof, any suitable means may be provided, such as the opposed horizontal slots 17 by which the skirt 12 is separated from the head portion 10 except in the vicinity of the wrist pin bosses 13.

As is well known in this art, those portions 12a of the surface of the skirt 12 which lie centrally between the wrist pin boss portions 13 constitute the thrust faces of the piston, and the diameter across such thrust faces must be carefully controlled to insure the maintenance of proper clearances of the piston with respect to its cylinder bore over the wide range of temperatures encountered in the normal operation in an internal combustion engine. It is therefore desirable that the effective diameter across the thrust faces of the piston skirt be carefully controlled to either remain substantially constant or, in any event, to increase at a rate not greater than the corresponding expansion of the cylinder bore in which the piston operates. The concentration of heat flow from the head portion 10 to the skirt 12 through the wrist pin boss portions thereof, of course, assists in the attainment of the desired expansion characteristics due to the hoop stretching effects thus produced upon the elliptically shaped skirt 12. However, this control alone is not sufficient.

In accordance with this invention, a positive expansion control is provided for the thrust faces of the piston skirt 12 by the incorporation of an expansion control strut 14 in the piston structure. Such strut has its opposite ends respectively anchored in the top of one of the thrust faces 12a of the piston skirt and the diametrically opposed portion of the piston head 10. The expansion control strut 14 may obviously take on a variety of shapes. It may be conveniently formed from a rod or wire of material of substantially lower thermal expansion coefficient than the material of the piston. In the specific example of an aluminum or magnesium alloy piston, an iron or steel wire or rod is very satisfactory. Such strut extends obliquely across the interior of the piston and is preferably substantially aligned with the plane of the major axis of the elliptical cross section of the piston skirt.

To facilitate the integral securement of the strut 14 to the piston skirt 12, an inwardly projecting boss 15 may be integrally formed in the skirt 12 adjacent the top of the thrust face portions 12a thereof. Similarly, an inwardly projecting boss 16 may be formed in the head portion 10 at a point diametrically opposite the boss 15. To effect the secure anchoring of the ends of the strut 14 in to the bosses 15 and 16, such ends are preferably turned outwardly as indicated at 14a and 14b respectively.

Those skilled in this art will recognize that the expansion control strut 14 may be integrally cast in its described position in the piston without complicating established casting techniques. Of course, when the piston is originally removed from the casting mold, there will undoubtedly be a thin fin of the piston metal extending from the top surface of the strut 14 to the overlying inner surfaces of the head portion 10. Such fin may be readily removed by a punching or sawing operation.

In the described construction, any tendency of the thrust face portion of the piston to expand is immediately offset by the equivalent tendency of the head portion 10 of the piston to expand. Furthermore, an additional controlling effect is produced by virtue of the fact that the material of the expansion control strut 14 has a substantially lower thermal coefficient of expansion than the material of the piston. By virtue of these factors, the expansion of the piston skirt 12 may be readily controlled so that over the normal range of operating temperatures encountered in any internal combustion engine, very little expansion of the piston skirt occurs along the direction of its major axis, while a substantial amount of expansion in the direction of its minor axis, which is aligned with the wrist pin bosses, is permitted to be produced so that the piston skirt when heated to its maximum operating temperature tends to assume the cylindrical configuration indicated by the dotted lines of Figure 3.

From the foregoing description, it is apparent that this invention provides a simple, readily manufacturable piston construction having unusually desirable expansion characteristics. Such characteristics are obtained without in any manner complicating the construction of the piston or the conventional manufacturing technique for producing such pistons, nor is any portion of the piston structurally weakened by virtue of the incorporation of the expansion control strut.

It will, of course, be understood that various details of construction may be modified through a wide range without departing from the principles of this invention and it is, therefore, not the purpose to limit the patent granted hereon otherwise than necessitated by the scope of the appended claims.

I claim as my invention:

1. A controlled expansion piston comprising a head portion, an integral, depending, hollow skirt having opposed wrist pin bosses, said skirt being separated from the head portion by a pair of opposed horizontal slots, said skirt being of generally oval configuration with the major axis thereof disposed transversely to the wrist pin boss axis, said slots arranged to concentrate heat flow from said head portion to said skirt in the vicinity of the said wrist pin bosses, an expansion control wire having it ends respectively anchored in said head portion and said skirt to control the thermal deformation of the skirt, said wire being obliquely disposed within said skirt and extending transversely across the interior thereof in the plane of the major axis of said skirt, whereby the skirt contour will tend to become circular in response to thermal expansion thereof.

2. A controlled expansion piston comprising a head portion, an integral, depending, hollow skirt having opposed wrist pin bosses, said skirt being of generally oval configuration with the major axis thereof disposed transversely to the wrist pin boss axis, a pair of opposed horizontal slot portions formed in said piston and separating the skirt and head portion, said slot portions arranged to concentrate heat flow from said head portion to said skirt in the vicinity of the said wrist pin bosses, an expansion control strut having its ends respectively anchored in said head portion and said skirt, said strut being obliquely disposed within said skirt and extending transversely across the interior thereof in the plane of the major axis of said skirt, said control strut comprising a rod of material of substantially lower thermal expansion coefficient than the material of the piston so that expansion will be taken up along the minor axis of the skirt, thereby changing the skirt contour towards a circular configuration.

3. A controlled expansion piston comprising a head portion, an integral, generally elliptical, hollow skirt separated from the head portion by a pair of opposed horizontal slots and having opposed wrist pin bosses, the major axis of said skirt disposed transversely to the wrist pin axis, said slots arranged to concentrate heat flow from said head portion to said skirt in the vicinity of said wrist pin bosses, and an expansion control rod having turned end portions respectively embedded in said head portion and said skirt, said rod extending across the interior of said skirt in the plane of the major axis of said skirt, whereby the skirt contour will tend to become circular in response to thermal expansion being taken up on the minor axis thereof.

ARTHUR TOWNHILL.

REFERENCES CITED

The following references are of record in the file of this patent:

UNITED STATES PATENTS

| Number | Name | Date |
|---|---|---|
| 1,465,144 | Nelson | Aug. 14, 1923 |
| 2,180,521 | Harley | Nov. 21, 1939 |
| 2,240,967 | Venner et al. | May 6, 1941 |
| 2,373,518 | Townhill | Apri. 10, 1945 |